Jan. 27, 1925.
C. R. SHORT
1,524,214
CLUTCH DISK FOR MOTOR VEHICLE CLUTCHES
Filed May 28, 1917
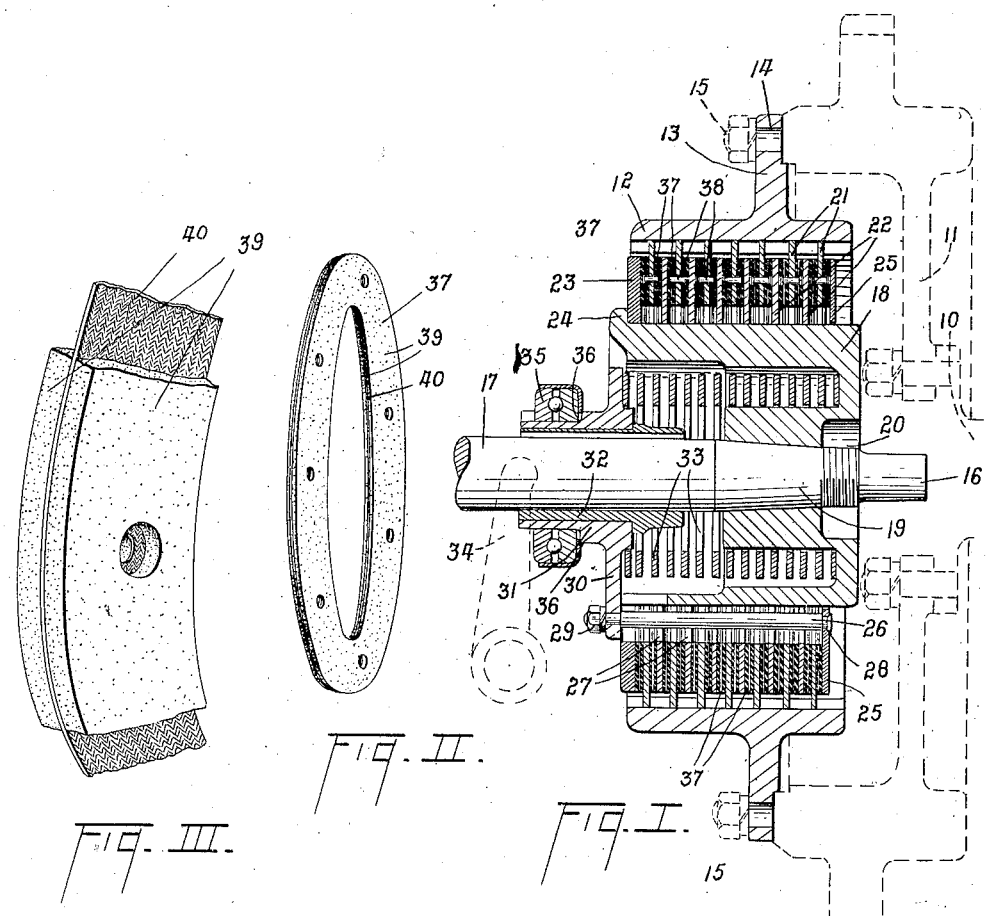
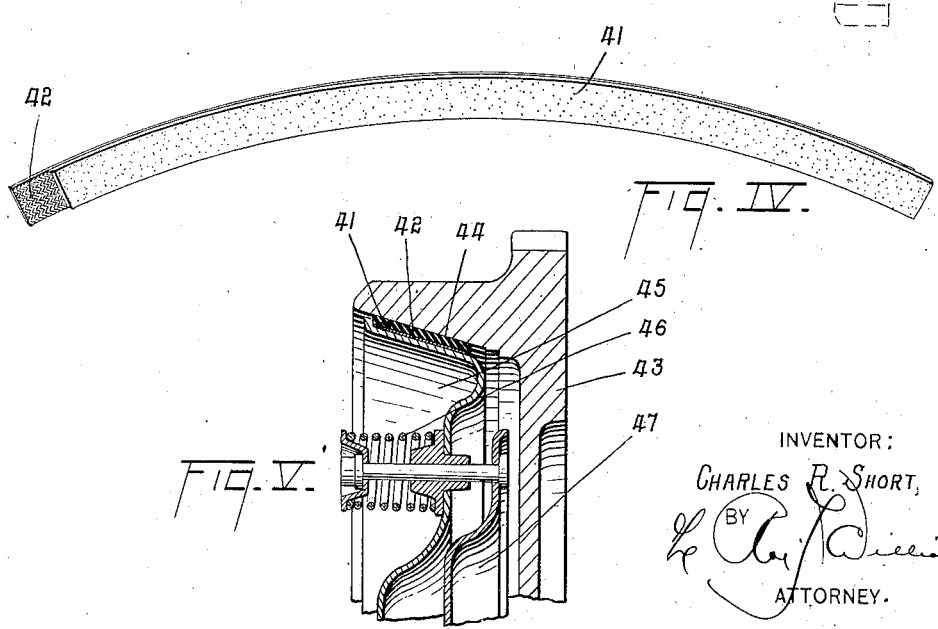
INVENTOR:
CHARLES R. SHORT,
BY
ATTORNEY.

Patented Jan. 27, 1925.

1,524,214

UNITED STATES PATENT OFFICE.

CHARLES R. SHORT, OF DETROIT, MICHIGAN.

CLUTCH DISK FOR MOTOR-VEHICLE CLUTCHES.

Application filed May 28, 1917. Serial No. 171,493.

*To all whom it may concern:*

Be it known that I, CHARLES R. SHORT, a subject of the King of Great Britain, and resident of Detroit, Wayne County, State of Michigan, have invented certain new and useful Improvements in Clutch Disks for Motor-Vehicle Clutches, of which the following is a specification.

My invention relates to a friction member designed to be used in clutch mechanism, of the type used in and forming a part of the power systems of self-propelled vehicles.

One of the objects of this invention is to provide economical, efficient and almost indestructible means for eliminating losses in power transmission systems.

Another object of this invention is to provide an improved friction absorbing material.

For some time it has been known that cork possesses a very high co-efficient of friction; and that it is not affected by many of the conditions which seriously impair the efficiency of other substances used for friction purposes. It also possesses a quality not found in any other substance; viz: that of altering its volume to a marked degree under pressure, being compressible and elastic, and if compressed, the resistance to compression continually grows stronger in a manner more like the resistance of a gas under compression, than that of an elastic solid, such as a spring. Moreover, the elasticity is not only great, but is very persistent. In fact the better grades of cork such as are used in bottling, expand when withdrawn from the necks of bottles and show an increase in volume of about 75%, even after having been confined under compression for many years.

It is the elasticity of cork, coupled with its high co-efficient of friction and its remarkable ability to withstand heat and wear, which makes it a valuable material for frictional purposes when used under compression, but it is a peculiarity, that while having much elasticity and strength when confined under pressure, it is brittle when not so compressed; and the very grade of cork that proves to be most indestructible when used under compression, breaks, owing to its brittleness and other peculiarities, if used for frictional purposes in its normally expanded and thus weakened condition. It is this fact that has made its successful use for frictional purposes impracticable unless some means is devised for using it under compression.

Previous to my invention, the only way which cork has been used as a friction material in pulleys, clutches or brakes has been by drilling or casting sockets in the faces of such members after which corks of much larger diameter than the sockets themselves have been inserted under pressure. These were corks in their natural state. However, in view of the fact that no method has been previously devised for compressing large bodies of cork and maintaining it in this condition under varying conditions, it has not been otherwise used, than as described above, as a friction material for pulleys, clutches and brakes.

I have discovered that I may utilize all of the very desirable qualities and characteristics of corks in connection with large area friction facings and materials by pulverizing or granulating it, providing a suitable binder, then compressing it into sheets or the desired forms and maintaining it under compression until the binder sets. This process may be carried out in a variety of ways. For example, I may pulverize the cork, mix it with a suitable cement binder, such as glycerine and albumin, and then compress it, or the pulverized cork may be compressed and the binder added while it is in this condition. The term "albumin" is used by me to designate a glue procurable in the open market and designated as "red albumin" by dealers therein, glue being in fact a crude form of albumin; and the glycerin is added to the binder to prevent it from drying out and becoming excessively hard.

However, I prefer to compress the cork and subject it to an extremely high temperature for melting and fusing the natural gums in the cork, and then adding another binder while the cork is under compression, and in a heated condition for increasing its stability. Of course, with any of these methods the material will be maintained under compression until the binder has been properly set by cooling and drying.

I have found that under extremely trying operating conditions, where the composition is subjected to very great friction and its temperature becomes high, the natural gums in the cork may be fused. To overcome this difficulty, I prefer to treat the cork with sulphur or sulphides or oxides, so that under extremely high temperature conditions these gums will be vulcanized. If it is desired, the friction material produced may be formed of several ply with a reinforcing fabric or gauze between them, thus providing a much stronger material. After the friction facing has been formed in the described manner, it may be secured into position on a pulley, clutch, or brake member, by some waterproof cement, such as shellac, or if it is provided with a reinforcing fabric, it may be suitably riveted in position.

It will, of course, occur to those skilled in the art, that many other ways may be devised, without departing from the spirit and scope hereof, for compounding my material and applying it in a satisfactory manner.

For a clear understanding of the application and use of my material for power transmission, especially in clutches for motor vehicle hydrocarbon motor power plants, reference is made to the following description, taken in connection with the accompanying drawings, which form a part of this specification and in which:

Figure 1 is a longitudinal vertical section of a multi-disc motor vehicle clutch;

Figure 2 is a perspective view of a clutch cork facing collar;

Figure 3 is a fragmentary perspective view of a three ply cork clutch facing, provided with a reinforcing fabric;

Figure 4 is a perspective view of reinforced cork facing, especially adapted for use in a cone clutch; and Figure 5 is a fragmentary transverse section of a cone clutch.

Referring to the drawings particularly Figures 1 to 3 inclusive, 10 and 11 respectively, illustrate in dotted lines the end of a motor crank shaft or driving shaft and the usual fly wheel. A clutch driving member or cage 12 is provided with a flange 13 having a plurality of openings 14 through which securing bolts 15 are adapted to be passed for connecting the cage to the fly wheel.

The forward end 16 of a driven shaft 17 is adapted to be suitably mounted in a bearing in the rear end of the driving shaft 10. A driven member or drum 18 is adapted to be secured on the tapered end 19 of the driven shaft by a securing nut 20. A plurality of metallic driving disks 21 are adapted to be splined to the driving member 12, and alternately arranged between the driving plates are driven disks 22, which are adapted to be splined to the periphery of the driven drum 18.

A retaining plate 23 is adapted to be arranged between the rear driving disk and an out turned flange 24 on the driven drum for preventing a rearward displacement of the driving and driven disks. A clamping plate 25 is arranged forward of the front disk at the opposite end of the drum 18.

It will be noted that a plurality of bolts 26 are adapted to be passed through slots 27 which are formed in the driven disks 22 and one end of each of these bolts is adapted to be riveted as at 28 to the clamping plate and their opposite ends are adapted to be connected as by nuts 29 to a flange 30 of an operating collar 31. The operating collar is arranged on a sleeve 32 which is slidably mounted on the driven shaft 19. A spring 33 is inserted between the forward end of the drum 18 and the operating collar 31 for normally maintaining the driving and driven disks 21 and 22 in driving relation. The driving connection may be released by moving forwardly an arm 34, which is shown in dotted lines against a thrust bearing 35 which is mounted against a shoulder 36 on the operating collar 30, and thus compressing the spring 33.

Arranged between each side of the driving disks 21 and an adjacent driven disk 22 is a clutch liner or facing in the form of a collar 37. These collars are secured in position, in the illustrated form, on the driving disks 21 as by rivets 38. Each of the collars 37 comprise two plys 39 of compressed cork composition, between which may be secured as by cementing, a reinforcing fabric or gauze 40.

Referring particularly to Figure 4, it will be noted that the clutch facing comprises a cork sheet 41 and a connecting and re-inforcing fabric 42. The opposite ends of the cork facing and the reinforcing fabric are staggered so that after the sheet is wrapped around the driving or driven drum of a clutch, the ends are lapped and cemented in position by any suitable means.

Referring particularly to Figure 5, 43 represents a fly wheel formed with a conical interior surface 44 having an angle of about 16 degrees and forming a driving member for a cone clutch. The complementary conical driven member 45 may be supported in any well known manner and is adapted to be moved forward by a spring 46 and to be released by an operating plate 47. In this figure I have shown arranged between the driving and driven members 44 and 45 respectively, a cork clutch facing such as is illustrated in Figure 4, which in this particular construction is preferably cemented to the driven drum.

While I have described and will specifically claim what I deem to be preferred processes, methods and applications of my invention, it will be obvious to those skilled in the art, that various modifications and changes may be made without departing from the spirit and scope hereof.

Having thus described my invention, what I claim and desire to secure by Letters Patent is:

1. As an article of manufacture, a metallic clutch disk having a facing of friction material in thin sheet form, said friction material comprising particles of cork held together in a compressed state or condition by a vulcanized binding material.

2. As an article of manufacture, a metallic clutch disk, and a thin sheet of friction material carried by said disk and comprising granulated cork the particles of which are held together and in a compressed condition by a vulcanized binding material.

3. As an article of manufacture, a metallic clutch disk, and a thin sheet of friction material carried by said disk and made up of a non-metallic granular substance the particles of which are in a compressed condition, all held together by a vulcanized binding material.

In testimony whereof I affix my signature.

CHAS. R. SHORT.